United States Patent [19]
Cohen

[11] 3,991,550
[45] Nov. 16, 1976

[54] STABILIZING LINES OR CABLES

[76] Inventor: Steven H. Cohen, 67-40 168 St., Queens, N.Y. 11365

[22] Filed: Apr. 11, 1975

[21] Appl. No.: 567,421

[52] U.S. Cl. .................................. 57/144; 174/42
[51] Int. Cl.² ...................... H02G 7/14; H01B 7/04; D07B 1/14
[58] Field of Search ............ 57/3, 6, 9, 139, 140 R, 57/140 J, 144, 145, 146, 147, 148, 149, 153, 160, 161, 162, 166; 174/42

[56] References Cited
UNITED STATES PATENTS

| | | | |
|---|---|---|---|
| 2,359,090 | 9/1944 | Dyer | 57/145 X |
| 2,587,521 | 2/1952 | Peterson | 174/42 |
| 2,609,653 | 9/1952 | Peterson | 174/42 X |
| 2,609,653 | 9/1952 | Peterson | 57/145 |
| 3,102,356 | 9/1963 | Luketa | 57/145 X |
| 3,336,744 | 8/1967 | Peene | 57/145 |
| 3,388,208 | 6/1968 | Liberman | 174/42 UX |
| 3,454,051 | 7/1969 | Goepfert et al. | 174/42 X |
| 3,625,809 | 12/1971 | Caroselli | 57/152 X |
| 3,659,038 | 4/1972 | Shealy | 57/145 X |
| 3,805,508 | 4/1974 | Maderna | 57/145 |
| 3,884,173 | 5/1975 | Fabula | 174/42 X |
| 3,916,083 | 10/1975 | Yakovlev et al. | 174/42 |

Primary Examiner—Donald E. Watkins

[57] ABSTRACT

A line having a central load-supporting member is provided with a stabilizing system to counteract instabilities caused by currents in a fluid surrounding the line. The stabilizing system comprises a single start helical formation projecting radially from the central member.

3 Claims, 3 Drawing Figures

FIG 1
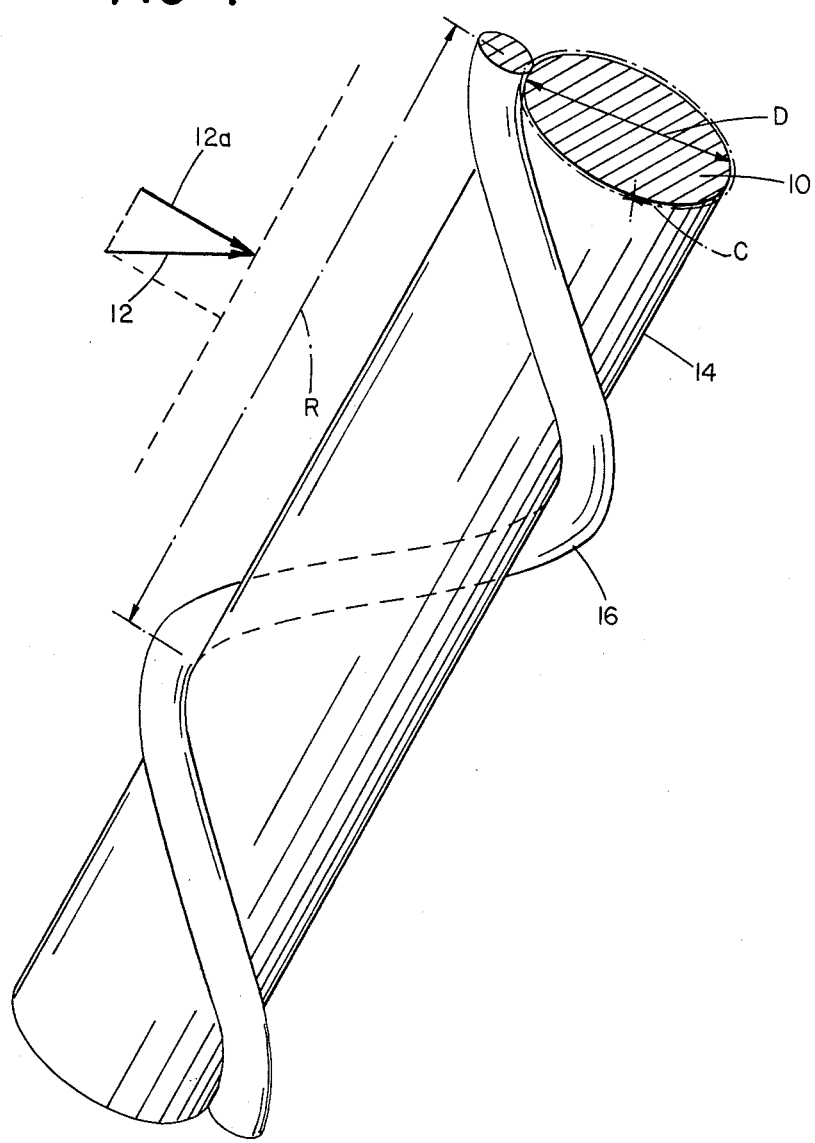
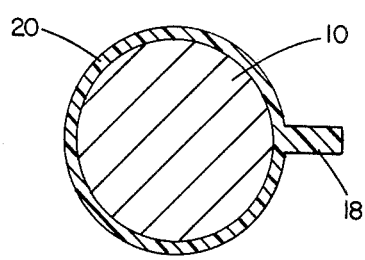
FIG 2
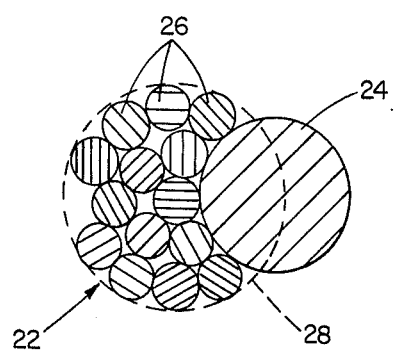
FIG 3

STABILIZING LINES OR CABLES

BACKGROUND OF THE INVENTION

This invention relates to lines or cables which, in use, are subjected to the forces of a fluid current. A particularly important example of lines is a deep-sea mooring line as used, for example, to retain a buoy at a predetermined depth and location in the ocean.

Such lines are subject to a current-induced vibration (often referred to as "strumming" which reduces the lifetime of the line and which can cause other problems in various line applications (e.g., interference with the effective operation of a hydrophone array secured to the line). Although various arrangements have been proposed for reducing strumming, each of these has suffered from one or more of various drawbacks.

Thus, heretofore it has been proposed to provide a thin rigid plate projecting radially from the outer surface of the line and pointing in the downstream direction of the current. Such an arrangement, however, would greatly increase the difficulty in paying-out or taking-up line over conventional drums and sheaves and would result in the generation of substantial forces of drag and/or lift where the plate was not parallel to the current (owing to the inevitable twist in a line of substantial length, variations of current direction with depth, etc.). In another proposal, the rigid plate is replaced by extended (i.e., of length several times the diameter of the cable) tufts of yarn secured to a braided outer wrapping of the line. Again there are lift and drag problems when the plane of the yarn is not parallel to the current at any depth. Additionally, deterioration of the yarn results from agitation produced by vortices created as the fluid flows past the line. In another arrangement a wing-like enclosure surrounds the line. The great expense of this arrangement, coupled with lift generation and obvious handling problems, has limited its usefulness. More obscure proposals have included the suggestion of a plurality of fins or wires, of very small diameter relative to that of the line, which extend either longitudinally or as a multiple-start helix around the line. While this proposal avoided the problems discussed above, it was a failure in not reducing the strumming to an acceptable level.

In view of the foregoing, it is a principal object of the present invention to provide a system for stabilizing a line or cable which experiences current forces, the system being effective to substantially reduce strumming, while not materially increasing drag or lift forces on the line. Further objects include the provision of such a system which permits the line to be handled by conventional drums and sheaves, which has a long operating lifetime, which achieves the principal objects independent of current direction relative to the line, and which is inexpensive.

SUMMARY OF THE INVENTION

A line constructed in accordance with the present invention comprises a load-supporting member and a stabilizing system which comprises a single start helical formation disposed around the load-supporting member. Preferably, that stabilizing formation projects from the central member outer surface by a distance equal to at least about $(10/\pi)\%$ of the circumferential length of the central member; the central member has a circular cross section and the repeat length of the helical formation is of the order of a plurality of diameters of the central member; the helical formation is provided either by a flexible elongated member wound around the central member or by a formation integral with an outer sheath of the central member; and the helical formation has either a polygonal or circular cross-sectional shape.

Other objects, features, and advantages of the invention will appear from the following description of particular preferred embodiments illustrated in the accompanying drawings.

BRIEF DESCRIPTION OF THE DRAWINGS

FIG. 1 is a perspective view of a cable or line segment constructed in accordance with the present invention;

FIG. 2 is a cross section of an alternative embodiment of a line segment constructed in accordance with the present invention; and FIG. 3 is a cross section of another alternative embodiment of a line constructed in accordance with the present invention.

DETAILED DESCRIPTION OF PARTICULAR PREFERRED EMBODIMENTS

FIG. 1 illustrates a load-bearing member 10 of generally circular cross-sectional shape having a diameter of D and a circumferential length of C. For a non-circular member, the maximum cross-sectional dimension, $d$, would be considered. For a circle, of course, $d = D$. The member 10 may be formed from a plurality of elements, which cooperate to give the member the properties it requires for the intended use of the line (e.g., strength, flexibility, corrosion resistance, etc.). Since such structure of the member 10 plays no part in the present invention, the member 10 has been illustrated simply as a homogeneous cylinder. The member 10 is typically employed in a fluid medium having a current vector 12 which includes a component 12a normal (or perpendicular) to the local line segment.

A single start helical formation, provided on the outer surface 14 of the member 10, is in the form of a second elongated flexible member 16 wound around the member 10 in contact with surface 14. The repeat length, R, of the helical formation is preferably greater than D. For use in a corrosive medium (e.g., the sea), the exterior surfaces, at least, of each of the members 10 and 16 are often formed from a corrosion-resistant material (e.g., a synthetic resin material). If the forces (e.g., the current, gravity, cable tension) on the line tend to cause member 16 to shift with respect to the member 10, it can be secured to the member 10 either continuously or at spaced apart locations.

In the alternative embodiment of FIG. 2, the helical formation is provided in the form of a rib 18 which is integral with, and projects from, a sheath 20 that provides the outer surface of member 10. In the illustrated embodiment, the rib 14 has a substantially rectangular cross-sectional shape and projects substantially perpendicularly from the outer surface of sheath 20. The sheath 20 and rib 18 can be formed in any conventional fashion (e.g., extrusion or spiral wrapping of the member 10 with a plastic strip having a longitudinally extending rib 18).

In FIG. 3, the line 22 is in the form of a braided wire rope formed from a multiplicity of strands which are twisted together. One strand 24 has a larger cross section than the other strands 26 and thus projects from a reference circle 28 drawn around the strands 26. Because all strands are twisted together, the projecting portion of strand 24 will be located at various regions of reference circle 28 at different longitudinal positions along the line 22, thereby producing the required helical formation.

While helical formations having particualr cross-sectional shapes (e.g., circular and rectangular) have been illustrated herein, other shapes are clearly possible. To achieve the desired disruption of the boundary layer flow, however, the cross-sectional shape of the helical formation should preferably provide a sharp pressure drop on the downstream side of the formation and should not smoothly merge with the outer surface of the central member. While an infinitely thin rib would probably be ideal, presently preferred practical cross-sectional shapes are circular and polygonal (e.g., triangular, square, rectangular, etc.).

The projection of a helical formation from the outer surface of the central member should be sufficient to cause the desired reduction of strumming (e.g., a formation projection equal to 10% of the central member diameter of $(10\pi)$% of the central member circumference), but not so much as to substantially increase the drag (e.g., a projection less than the diameter of the central member).

In any embodiment the projecting formation need not have precise periodicity nor even need be continuous. For this reason, the word "helix", as used herein, is intended to indicate that the formation is wrapped around the central member and travels along the length of the central member, without requiring all features of more conventional helices (e.g., strict periodicity, continuity, uniformity of cross section, etc.).

While particular preferred embodiments of the present invention have been illustrated in the accompanying drawings and described in detail herein, other embodiments are within the scope of the invention and the following claims.

I claim:

1. A line for use in a fluid medium having a fluid current with a velocity component normal to at least a portion of the line, the line being formed from a multiplicity of the elongated elements twisted together, one of said elements having a cross-section which is larger than all other elements, said all other elements defining an outer surface of the line which has a predetermined circumferential length, said one element having a cross-sectional size and shape such that it projects from said outer surface a distance equal to about $(10/\pi)$% of said predetermined circumferential length.

2. A line as claimed in claim 1 wherein said outer surface is substantially circular defining a line diameter D and said one element projects from said outer surface by a distance equal to at least about 10% of D.

3. A line for use in a fluid medium having a fluid current with a velocity component normal to at least a portion of the line, the line being formed from a multiplicity of elongated elements twisted together, one of said elements having a cross-section which is larger than all other elements, said all other elements defining an outer surface of said line having a maximum cross-sectional dimension, $d$, the twist of said line being such that said one element completes a single turn around said outer surface in a distance along the length of the line which is greater than approximately $d$.

* * * * *